United States Patent
Maienschein

(10) Patent No.: US 8,919,509 B2
(45) Date of Patent: Dec. 30, 2014

(54) TORQUE TRANSFER DEVICE

(75) Inventor: Stephan Maienschein, Baden-Baden (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 1481 days.

(21) Appl. No.: 12/001,813

(22) Filed: Dec. 13, 2007

(65) Prior Publication Data

US 2008/0156607 A1  Jul. 3, 2008

(30) Foreign Application Priority Data

Dec. 18, 2006  (DE) .................. 10 2006 059 666

(51) Int. Cl.
*F16H 45/02* (2006.01)

(52) U.S. Cl.
CPC .......... *F16H 45/02* (2013.01); *F16H 2045/021* (2013.01); *F16H 2045/0215* (2013.01); *F16H 2045/0247* (2013.01); *F16H 2045/0284* (2013.01)
USPC ... 192/3.3; 192/55.61; 192/70.12; 192/70.17; 192/113.34; 192/212

(58) Field of Classification Search
CPC ................ F16H 2045/0215; F16H 2045/0247
USPC ............... 192/3.29, 3.3, 55.61, 70.12, 70.17, 192/113.34, 212
See application file for complete search history.

(56) References Cited

U.S. PATENT DOCUMENTS

| | | | | |
|---|---|---|---|---|
| 4,082,011 A | * | 4/1978 | McQuinn et al. | 477/30 |
| 5,441,135 A | * | 8/1995 | Worner et al. | 192/3.29 |
| 5,964,329 A | * | 10/1999 | Kawaguchi et al. | 192/3.3 |
| 6,112,869 A | * | 9/2000 | Krause et al. | 192/3.29 |
| 6,343,679 B1 | * | 2/2002 | Kundermann | 192/3.3 |
| 6,394,243 B1 | * | 5/2002 | Sasse | 192/3.29 |
| 6,508,346 B1 | * | 1/2003 | Simpson | 192/3.3 |
| 6,758,315 B2 | * | 7/2004 | Bauer et al. | 192/3.29 |
| 7,036,643 B2 | * | 5/2006 | Back et al. | 192/3.3 |
| 7,055,663 B2 | * | 6/2006 | Leber | 192/3.25 |
| 2005/0056512 A1 | * | 3/2005 | Sasse et al. | 192/3.3 |
| 2005/0133328 A1 | * | 6/2005 | Masuya | 192/3.3 |
| 2005/0155831 A1 | * | 7/2005 | Masuya | 192/3.3 |
| 2006/0124420 A1 | * | 6/2006 | Ackermann | 192/3.29 |
| 2006/0207851 A1 | * | 9/2006 | Heuler et al. | 192/3.3 |

FOREIGN PATENT DOCUMENTS

DE  103 50 935  5/2004

* cited by examiner

*Primary Examiner* — Gene Crawford
*Assistant Examiner* — Terry Chau
(74) *Attorney, Agent, or Firm* — Simpson & Simpson, PLLC

(57) ABSTRACT

A torque transfer device, in particular in the power train of a motor vehicle, for transferring torque between a drive unit and a shaft that is rotatable around an axis of rotation, in particular a transmission input shaft, having a hydrodynamic torque converter, which includes a converter cover that is connectable to or connected to the drive unit, which converter cover may be coupled via an impeller to a turbine wheel to transfer torque, which turbine wheel is bridgeable, to transfer torque, by a torque converter lockup clutch, which includes a piston that is movable to a limited extent in the axial direction and is constructed as a multi-plate clutch with a plate pack that includes outer plates which are connected to an outer plate carrier in a rotationally fixed connection, and inner plates which are connected to an inner plate carrier in a rotationally fixed connection.

10 Claims, 2 Drawing Sheets

TORQUE TRANSFER DEVICE

CROSS REFERENCE TO RELATED APPLICATION

This patent claims priority of German Patent Application No. 10 2006 059 666.9, filed Dec. 18, 2006, which application is incorporated herein by reference.

FIELD OF THE INVENTION

The invention relates to a torque transfer device for a motor vehicle.

BACKGROUND OF THE INVENTION

A torque transfer device of this type is known for example from German published unexamined application DE 103 50 935 A1.

SUMMARY OF THE INVENTION

The invention relates to a torque transfer device, in particular in the power train of a motor vehicle, for transferring torque between a drive unit and a shaft that is rotatable around an axis of rotation, in particular a transmission input shaft, having a hydrodynamic torque converter, which includes a converter cover that is connectable to or connected to the drive unit, which converter cover may be coupled via an impeller to a turbine wheel to transfer torque, which turbine wheel is bridgeable, to transfer torque, by a torque converter lockup clutch, which includes a piston that is displaceable to a limited extent in the axial direction and is constructed as a multi-plate clutch with a plate pack that includes outer plates which are connected to an outer plate carrier in a rotationally fixed connection, and inner plates which are connected to an inner plate carrier in a rotationally fixed connection.

The object of the invention is to create a torque transfer device which is simply designed and is capable of being manufactured economically. In particular, adequate cooling of the plate pack of the torque converter lockup clutch is to be ensured.

In the case of the torque transfer device of the present invention, the problem is solved by connecting the inner plate carrier through a coolant conducting device in a rotationally fixed connection to a guide piece in which one end of the shaft is guided, and which is connected to the converter cover in a rotationally fixed connection. It is possible for the guide piece to be connected to the coolant conducting device and/or to the converter cover in a single piece. It is also possible for the coolant conducting device to be connected to the converter cover in a single piece. The arrangement of the coolant conducting device according to the invention allows forced guidance of a stream of coolant over the plates to be possible in a simple manner.

In a preferred exemplary embodiment of the torque transfer device, a coolant channel runs in the axial direction between the coolant conducting device and the piston. A stream of coolant is forced through the plates of the torque converter lockup clutch by the coolant channel.

In a further preferred exemplary embodiment of the torque transfer device, the coolant channel extends radially inward from the plate pack between the coolant conducting device and the piston to the guide piece. Preferably a coolant stream is fed to the plate pack radially on the outside which flows past the plates into the coolant channel and is led off radially inwardly.

In a further preferred exemplary embodiment of the torque transfer device, the coolant channel is connected to another coolant channel by way of at least one through hole. The additional coolant channel is preferably formed by an annular space which extends radially around the outside of the shaft.

In a further preferred exemplary embodiment of the torque transfer device, the through hole extends in the radial direction toward the shaft or in the axial direction toward a damper hub.

In a further preferred exemplary embodiment of the torque transfer device, the inner plate carrier is attached to the coolant conducting device. Preferably, the inner plate carrier is attached to the coolant conducting device by means of rivet fastening elements.

In a further preferred exemplary embodiment of the torque transfer device, the outer plate carrier is connected in a rotationally fixed connection with an input part of a torsional vibration damping device, through which the outer plate carrier is coupled with a damper hub or the damper hub, which is connected to the shaft in a rotationally fixed connection. Preferably, the outer plate carrier is attached to the input part of the torsional vibration damping device by means of rivet fastening elements.

In a further preferred exemplary embodiment of the torque transfer device, the coolant conducting device is materially connected to the guide piece. Preferably, the coolant conducting device is attached to the guide piece by a welded connection.

In a further preferred exemplary embodiment of the torque transfer device, a seal contact area is provided between the guide piece and the damper hub. The seal contact area preferably includes a ring seal, which is received in an annular groove.

In a further preferred exemplary embodiment of the torque transfer device, a seal contact area is provided between the damper hub and a turbine wheel hub. The seal contact area preferably includes a ring seal, which is partially received in an annular groove.

In a further preferred exemplary embodiment of the torque transfer device, the hydrodynamic torque converter includes a three-channel system, through which the operation of the torque converter lockup clutch is controlled. The flow through each of the individual channels can be in one direction or two. The design of the torque transfer device according to the invention makes it possible to realize forced guidance of a stream of coolant through the plate pack, in particular a stream of cooling oil, in a simple manner. As a result, the cooling capacity for cooling the torque converter lockup clutch can be increased substantially.

BRIEF DESCRIPTION OF THE DRAWINGS

Additional advantages, characteristics and details of the invention are evident from the following description, in which various exemplary embodiments are described in detail with reference to the drawing. The figures show the following.

DETAILED DESCRIPTION OF THE INVENTION

Figure 1:
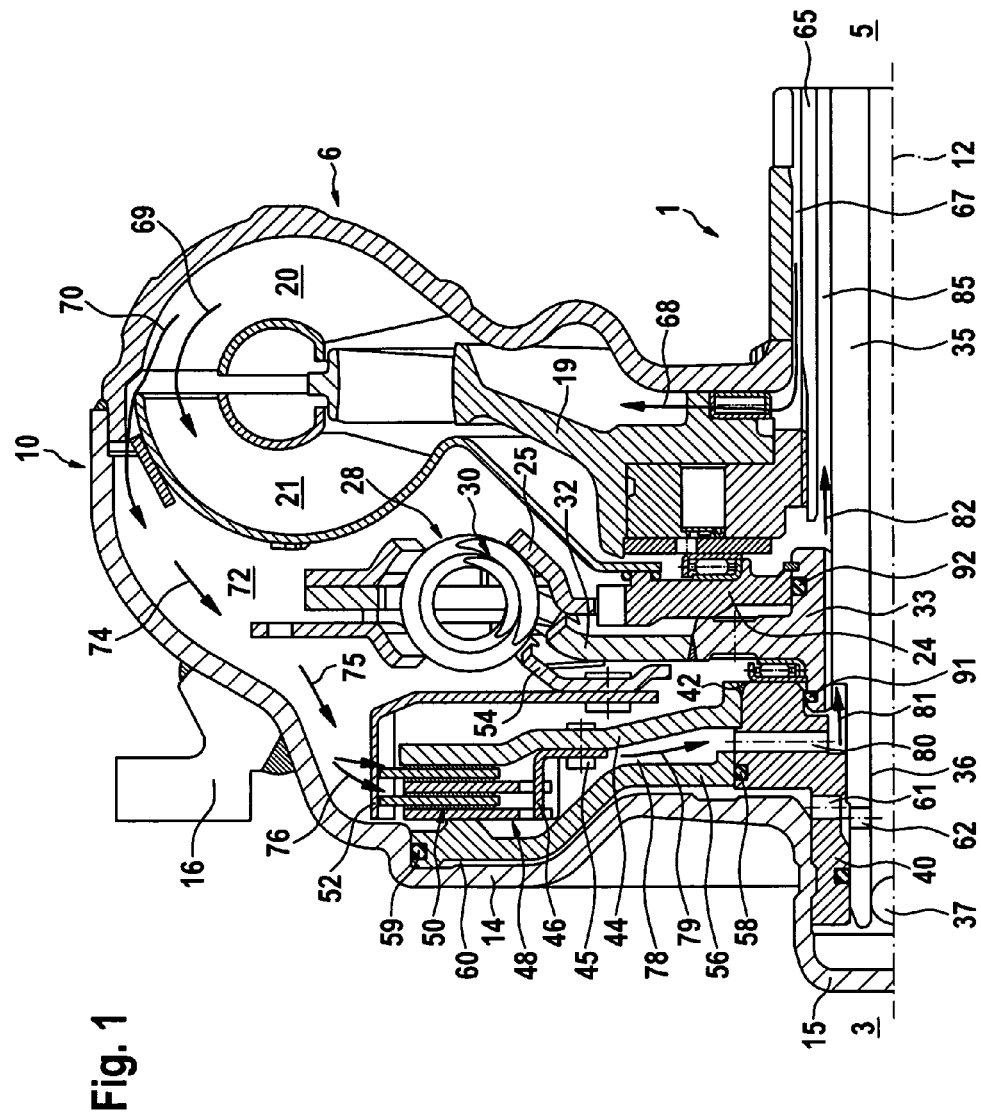
FIG. 1 is a torque transfer device according to a first exemplary embodiment in half-sectional view; and, FIG. 2 is a torque transfer device according to a second exemplary embodiment in half-sectional view.
Figure 2:
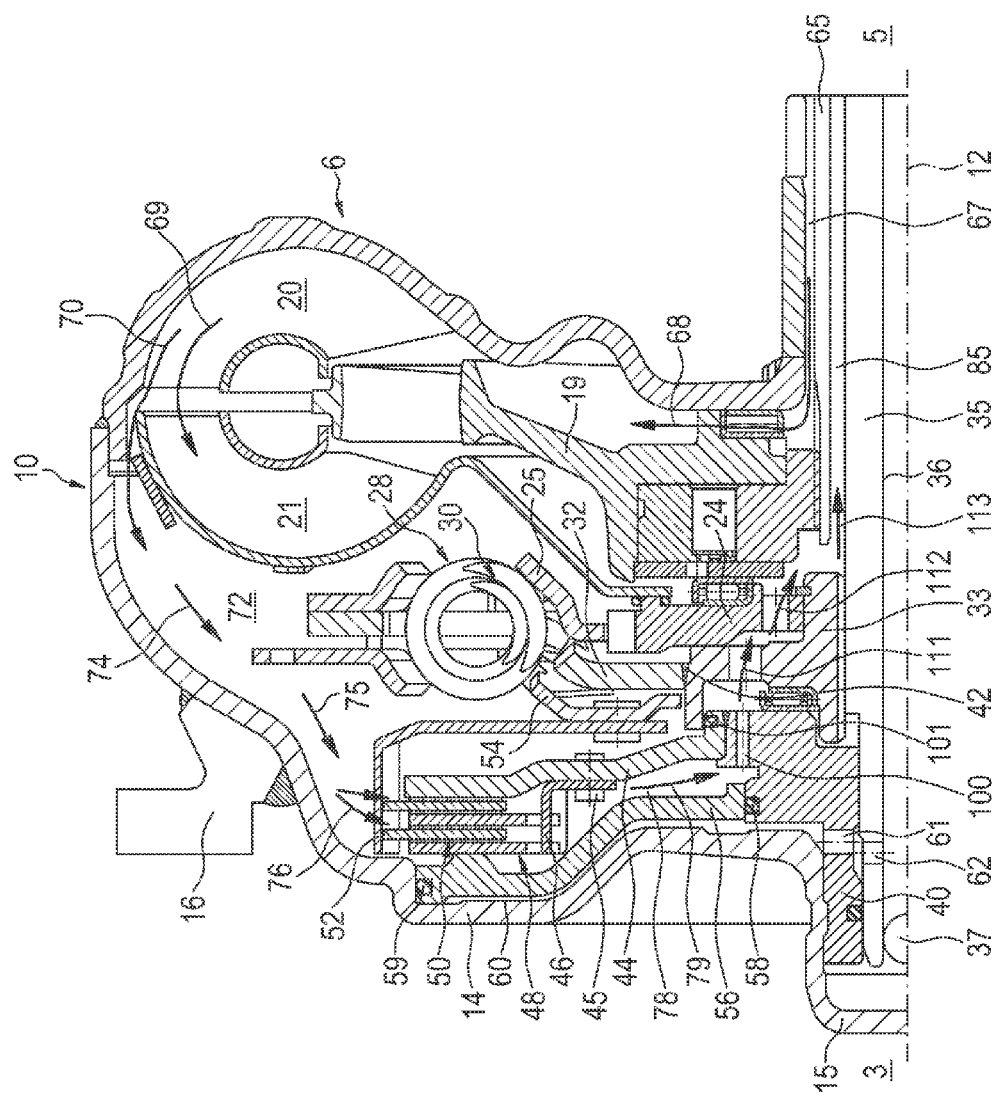

FIGS. 1 and 2 each depict part of power train 1 of a motor vehicle. Between drive unit 3, in particular a combustion engine, which is only indicated by a reference label and from which a crankshaft emerges, and transmission 5, which is also only indicated by a reference label, hydrodynamic torque converter 6 is situated. The crankshaft of combustion engine 3 is connected to housing 10 of torque converter 6 in a rotationally fixed connection, for example through a sheet metal drive plate, which is also known as a flex plate. Housing 10 of torque converter 6 is rotatable around axis of rotation 12, and is equipped close to the drive with housing wall 14, which is also called the converter cover.

Converter cover 14 has central pot-shaped area 15. Radially outside of pot-shaped area 15, sheet metal linking plate 16 is attached to converter cover 14. The function of sheet metal linking plate 16 is to attach converter cover 14 to the sheet metal drive plate.

Hydrodynamic torque converter 6 includes guide wheel 19, impeller 20 and turbine wheel 21. Turbine wheel 21 is attached to turbine wheel hub 24. Turbine wheel hub 24 is connected radially on the outside in a rotationally fixed connection to input part 25 of torsional vibration damper 28. Input part 25 of torsional vibration damper 28 is coupled with output part 32 of torsional vibration damper 28, with energy storage elements 30 interposed. Output part 32 of torsional vibration damper 28 is attached to damper hub 33, which is connected to transmission input shaft 35 in a rotationally fixed connection. Transmission input shaft 35 includes central cavity 36, which is closed at one end of transmission input shaft 35 by closing element 37. The end of transmission input shaft 35 with closing element 37 is rotatably guided or received in guide piece 40.

Attached to guide piece 40 with the help of welded connection 42 is coolant conducting device 44, which extends essentially radially outward from guide piece 40. Attached to coolant conducting device 44 with the help of rivet fastening elements 45 is inner plate carrier 46 of a torque converter lockup clutch. Torque converter lockup clutch 48 includes plate pack 50 with inner plates, which are connected to inner plate carrier 46 in a rotationally fixed connection, and outer plates, which are connected to outer plate carrier 52 in a rotationally fixed connection. Outer plate carrier 52 is attached to additional input part 54 of torsional vibration damper 28.

Torque converter lockup clutch 48 also includes piston 56, which is capable of limited movement in the axial direction, i.e., parallel to axis of rotation 12. Radially on the inside, piston 56 has a guide and seal area with seal 58 vis-à-vis guide piece 40. Radially on the outside, piston 56 has a guide and seal area with seal 59 vis-à-vis converter cover 14. The function of seals 58, 59 is to seal off pressure chamber 60 which extends in the axial direction between piston 56 and converter cover 14. Pressure chamber 60 is connected with cavity 36 in the interior of shaft 35 via through-hole 61, which extends in the radial direction through guide piece 40, and another through-hole 62, which extends through shaft 35 in the radial direction.

An essentially round cylindrical jacket shaped section of coupling element 65 extends radially outside of and coaxial to shaft 35. In the radial direction between shaft 35 and coupling element 65 extends annular first channel 67. First channel 67 is part of a three-channel system, which enables oil circulation in converter housing 10 and controlling of torque converter lockup clutch 48. The oil stream described below for the circulation can flow in two directions. The directions depicted in FIGS. 1 and 2 are thus only examples, and are not to be understood as limiting. From first channel 67 a coolant, preferably cooling oil or oil flows first to impeller 20, as indicated by arrow 68. Part of the oil then completes a continuation of the toroidal flow to turbine wheel 21, as indicated by arrow 69, and to guide wheel 19. The other part of the oil emerges at a gap between impeller 20 and turbine wheel 21 and discharges into space 72 in the interior of converter housing 10, as indicated by arrow 70.

Arrows 74 through 76 indicate that the stream of oil is guided to plate pack 50 of torque converter lockup clutch 48 by outer plate carrier 52. There the oil stream is guided past the plates of plate pack 50 for cooling, and radially within the plates arrives at coolant channel 78, which extends between piston 56 and coolant conducting device 44. Arrow 79 indicates that in the exemplary embodiment shown in FIG. 1 the stream of cooling oil is guided radially toward the inside by at least one through-hole 80 in guide piece 40.

Arrows 81, 82 indicate that the stream of cooling oil enters into an annular space that is provided between shaft 35 and coupling element 65. Since the flow connection between cavity 36 in shaft 35 and pressure chamber 60 is also designated as a second channel, annular space 85 is also designated as a third channel. When pressure chamber 60 is charged with oil pressure through the second channel, then torque converter lockup clutch 48 engages, in piston 56 traverses to the right and in so doing presses the plates of plate pack 50 against an axial stop, which may be formed by a radially outer stop section of coolant conducting device 44. But if pressure chamber 60, which is also designated as the second chamber, is left unpressurized or subjected to only slight pressure, then oil pressure from chamber 72, which is also designated as the first chamber, forces torque converter lockup clutch 48 open again.

The result of the defined flow connection between first channel 67 or first chamber 72 and third channel 85 is that the stream of oil is inevitably guided through the plates of plate pack 50 of torque converter lockup clutch 48. Seal contact area 91 is provided in the radial direction between damper hub 33 and guide piece 40. Another seal contact area 92 is provided in the radial direction between damper hub 33 and turbine wheel hub 24.

In the exemplary embodiment depicted in FIG. 2, through-hole 100 extends through guide piece 40 in the axial direction, i.e., parallel to axis of rotation 12. Seal contact area 101 is provided in the radial direction between coolant conducting device 44 and damper hub 33.

Arrows 111 through 113 indicate that the stream of cooling oil flows from coolant channel 78 through guide piece 40, damper hub 33 and turbine wheel hub 24 into annular space 85, which is also designated as the third channel. In principle, the direction of oil flow designated by the arrows is possible, but the opposite direction of flow is also possible.

REFERENCE NUMBERS 1 power train
3 drive unit
5 transmission
6 hydrodynamic torque converter
10 housing
12 axis of rotation
14 housing wall
15 central pot-shaped area
16 sheet metal linking plate
19 guide wheel
20 impeller
21 turbine wheel
24 turbine wheel hub
25 input part
28 torsional vibration damper
30 energy storage element 32 output part
33 damper hub
35 transmission input shaft
36 cavity
37 closing element
40 guide piece
42 welded connection
44 coolant conducting device
45 rivet fastening element
46 inner plate carrier
48 torque converter lockup clutch
50 plate pack
52 outer plate carrier
54 input part
56 piston
58 seal
59 seal
60 pressure chamber
61 through hole
62 through hole
65 coupling element
67 first channel
68 arrow
69 arrow
70 arrow
72 chamber
73 arrow
74 arrow
75 arrow
76 arrow
78 coolant channel
79 arrow
80 through hole
81 arrow
82 arrow
85 third channel
91 seal contact area
92 seal contact area
100 through hole
101 seal contact area
111 arrow
112 arrow
113 arrow

What is claimed is:

1. A torque transfer device in the power train of a motor vehicle, for transferring torque between a drive unit (3) and a transmission input shaft (35) that is rotatable around an axis of rotation (12) for the transmission input shaft, having a hydrodynamic torque converter (6), which includes a converter cover (14) that is connectable to or connected to the drive unit (3), which converter cover may be coupled via an impeller (20) to a turbine wheel (21) to transfer torque, which turbine wheel is bridgeable, to transfer torque, by a torque converter lockup clutch (48), which includes a piston (56) that is movable to a limited extent in the axial direction and is constructed as a multi-plate clutch with a plate pack (50) that includes outer plates which are connected to an outer plate carrier (52) in a rotationally fixed connection, and inner plates which are connected to an inner plate carrier (46) in a rotationally fixed connection, the torque transfer device including:
a guide piece (40) permanently non-rotatably connected to the converter cover and arranged to directly contact and guide the transmission input shaft;
a coolant conducting device (44) permanently non-rotatably connected to the guide piece (40);
a first coolant channel at least partially disposed between the coolant conducting device and the piston;
at least one through-hole (100) in the guide piece, the at least one through-hole wholly enclosed by the guide piece in a radial direction orthogonal to an axis of rotation for the torque converter and including:
a first end in the guide piece opening directly into the first coolant channel; and,
a second end, wherein:
the inner plate carrier is permanently non-rotatably connected to the coolant conducting device when the converter clutch is open; and,
a line parallel to an axis of rotation for the torque converter passes through the through-hole and the first and second ends of the through hole without touching the guide piece.

2. The torque transfer device recited in claim 1, wherein the first coolant channel runs in the axial direction between the coolant conducting device (44) and the piston (56).

3. The torque transfer device recited in claim 2, wherein the first coolant channel extends from the plate pack (50) between the coolant conducting device (44) and the piston (56) radially inward to the guide piece (40).

4. The torque transfer device recited in claim 2, wherein the first coolant channel is connected with a second coolant channel through the at least one through-hole in the guide piece (40).

5. The torque transfer device recited in claim 4, wherein the through-hole (100) extends in the axial direction toward a damper hub (33).

6. The torque transfer device recited in claim 1, wherein the inner plate carrier (46) is attached to the coolant conducting device (44).

7. The torque transfer device recited in claim 1, wherein the outer plate carrier (52) is connected in a rotationally fixed connection to an input part (54) of a torsional vibration damping device (28), through which the outer plate carrier (52) is coupled with a damper hub, which is connected to the shaft (35) in a rotationally fixed connection.

8. The torque transfer device recited in claim 7, wherein a seal contact area (91; 101) is provided between the guide piece (40) and the damper hub (33).

9. The torque transfer device recited in claim 1, wherein the hydrodynamic torque converter (6) includes a three-channel system, through which the operation of the torque converter lockup clutch (48) is controlled.

10. A torque transfer device in the power train of a motor vehicle, for transferring torque between a drive unit (3) and a transmission input shaft (35) that is rotatable around an axis of rotation (12) for the transmission input shaft, having a torsional vibration device including an input part, an output part non-rotatably connected to a damper hub arranged to contact the shaft and transfer torque to the shaft, and an energy storage element engaged with the input and output parts for the torsional vibration damper, a hydrodynamic torque converter (6), which includes a converter cover (14) that is connectable to or connected to the drive unit (3), which converter cover may be coupled via an impeller (20) to a turbine wheel (21) to transfer torque, which turbine wheel is bridgeable, to transfer torque, by a torque converter lockup clutch (48), which includes a piston (56) that is movable to a limited extent in the axial direction and is constructed as a multi-plate clutch with a plate pack (50) that includes outer plates which are connected to an outer plate carrier (52) in a rotationally fixed connection, and inner plates which are connected to an inner plate carrier (46) in a rotationally fixed connection, wherein:

the inner plate carrier is permanently non-rotatably connected to a coolant conducting device when the converter clutch is open;
the coolant conducting device is permanently non-rotatably connected to a guide piece;
the guide piece is permanently non-rotatably connected to the converter cover and is arranged to directly contact and guide the shaft;
a first coolant channel is at least partially disposed between the coolant conducting device and the piston;
a first end of a through-hole in the guide piece opens directly into the first coolant channel;
the through-hole includes a second end;
the at least one through-hole is enclosed by the guide piece;
a line parallel to an axis of rotation for the torque converter passes through the through-hole and the first and second ends of the through hole without touching the guide piece;
the outer plate carrier is directly and non-rotatably connected to the input part of the torsional vibration damping device.

\* \* \* \* \*